(12) United States Patent
Morris

(10) Patent No.: US 10,624,321 B1
(45) Date of Patent: Apr. 21, 2020

(54) FISH WEIGH-IN BAG SUPPORT AND FILL SYSTEM

(71) Applicant: Johnny Morris, Vallonia, IN (US)

(72) Inventor: Johnny Morris, Vallonia, IN (US)

( * ) Notice: Subject to any disclaimer, the term of this patent is extended or adjusted under 35 U.S.C. 154(b) by 526 days.

(21) Appl. No.: 14/945,419

(22) Filed: Nov. 18, 2015

Related U.S. Application Data

(60) Provisional application No. 62/123,606, filed on Nov. 21, 2014.

(51) Int. Cl.
*A01K 97/05* (2006.01)
*A01K 61/00* (2017.01)
*A01K 97/20* (2006.01)
*A01K 99/00* (2006.01)
*A01K 63/02* (2006.01)

(52) U.S. Cl.
CPC ............ *A01K 61/001* (2013.01); *A01K 63/02* (2013.01); *A01K 97/05* (2013.01); *A01K 97/20* (2013.01); *A01K 99/00* (2013.01)

(58) Field of Classification Search
USPC ................ 119/228, 200, 201, 203; 137/272
See application file for complete search history.

(56) References Cited

U.S. PATENT DOCUMENTS

| | | | |
|---|---|---|---|
| 270,094 A | 1/1883 | Moore | |
| 1,373,324 A * | 3/1921 | Gomez | A01G 25/00 239/110 |
| 2,611,645 A * | 9/1952 | Forman | B05B 3/00 239/211 |
| 2,722,770 A | 3/1954 | Giordano | |
| 2,949,882 A * | 8/1960 | Thomas, Jr. | A01K 63/02 119/203 |
| 3,523,549 A * | 8/1970 | Anderson | E03B 9/14 137/288 |
| 3,854,236 A | 12/1974 | Goserud | |
| 3,858,599 A * | 1/1975 | Carlson | E03B 9/14 137/151 |
| 4,033,280 A | 7/1977 | Wood | |
| 4,099,670 A * | 7/1978 | Cole | B05B 15/74 239/205 |
| 4,372,339 A * | 2/1983 | Anderson | E03B 9/04 137/288 |
| 4,498,190 A | 2/1985 | Garlick, III | |
| 4,573,679 A * | 3/1986 | Janszen | A63B 69/0091 472/137 |
| 4,708,084 A | 11/1987 | Campau | |
| 4,782,624 A | 11/1988 | Head | |
| D307,627 S * | 5/1990 | Anderson | D23/214 |
| 4,970,982 A | 11/1990 | Martin | |

(Continued)

FOREIGN PATENT DOCUMENTS

JP    S003-49457    *    2/2003    ............... E03B 9/04

*Primary Examiner* — Andrea M Valenti
(74) *Attorney, Agent, or Firm* — Middleton Reutlinger

(57) ABSTRACT

An apparatus and system is disclosed for facilitating an angler in placing fish into a weigh-in bag from a boat's live well. The apparatus includes a post for inserting into a seat post receiver of a boat, and has a hook on its top for receiving handles of a weigh-in bag. The apparatus also preferably includes a fill tube connected to the pumping system of a boat's live well plumbing system. The apparatus holds and fills the bag in a position and location convenient to allow an angler to use both hands to retrieve a fish from a live well and then insert the fish into the bag.

16 Claims, 10 Drawing Sheets

(56) References Cited

U.S. PATENT DOCUMENTS

| | | | |
|---|---|---|---|
| 5,010,836 A | | 4/1991 | Riviezzo |
| 5,236,175 A | | 8/1993 | Campau |
| 5,632,220 A | | 5/1997 | Vento |
| 5,921,512 A | | 7/1999 | Torres |
| 5,996,142 A | * | 12/1999 | Colman ................ E03B 9/20 239/276 |
| 6,178,988 B1 | * | 1/2001 | Royle ................ E03B 9/14 137/288 |
| 6,415,733 B1 | | 7/2002 | Hudson et al. |
| 6,520,606 B1 | * | 2/2003 | Robinson ............ A61G 17/08 27/1 |
| 7,114,202 B1 | * | 10/2006 | Padrick ............... A47K 3/285 4/615 |
| 7,401,620 B2 | * | 7/2008 | Ball .................... E03B 9/04 137/107 |
| 8,393,110 B2 | | 3/2013 | Ball |
| 8,408,238 B1 | * | 4/2013 | Anderson ............ E02B 9/022 137/288 |
| 2006/0112609 A1 | | 6/2006 | Lee |
| 2008/0302924 A1 | | 12/2008 | Albert |
| 2008/0313801 A1 | * | 12/2008 | Saxon ................. B63B 29/14 4/599 |

\* cited by examiner

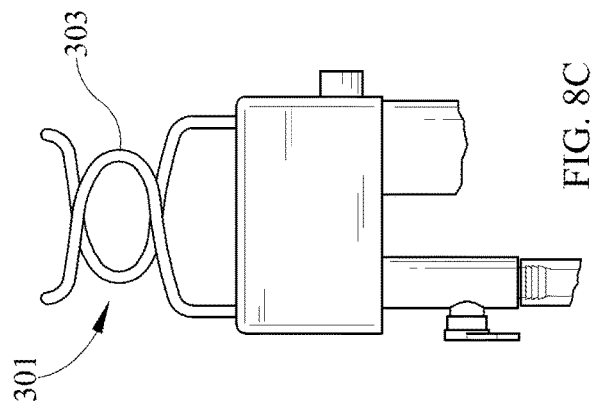
FIG. 8C
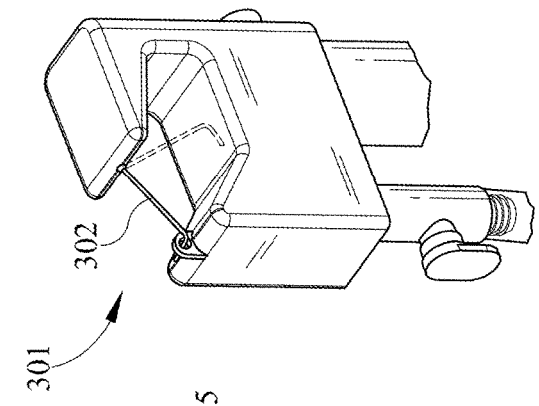
FIG. 8F
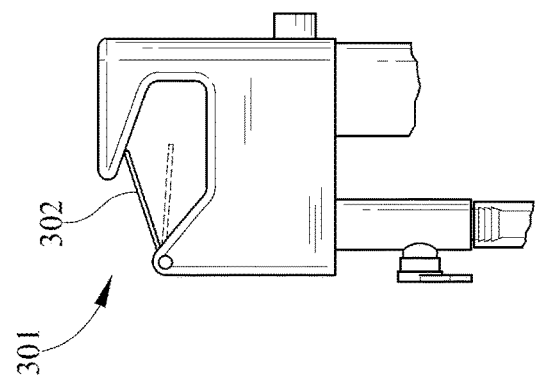
FIG. 8B
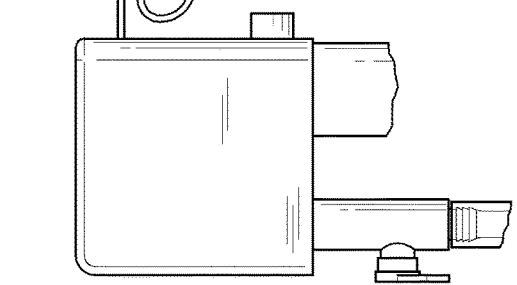
FIG. 8E
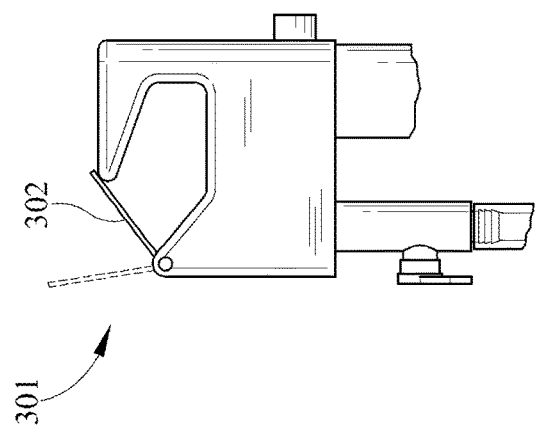
FIG. 8A
FIG. 8D

FISH WEIGH-IN BAG SUPPORT AND FILL SYSTEM

CROSS-REFERENCE TO RELATED APPLICATIONS

This application claims priority to and benefit from U.S. Provisional Patent Application Ser. No. 62/123,606, entitled "Sack Caddy," filed Nov. 21, 2014, the entire contents of which are incorporated herein by reference.

FIELD

The present disclosure is directed to methods and apparatus for facilitating the collection and transport of fish in a container for transport to another location. In particular, the disclosure relates to apparatus and methods for holding and filling a container in a position and location convenient to allow a user to use both hands to retrieve a fish from a live well and insert the fish into the transport container.

BACKGROUND

Fishing is a popular activity enjoyed by millions of people worldwide. While most who enjoy the activity do so in a leisure capacity, others do it for sport, for competition, or for their livelihood. Indeed, many competitions and tournaments exist wherein anglers compete to catch the most weight of a particular species of fish in a given amount of time. Such fishing contests are very popular, and most have adopted the "catch-and-release" method. In this method, fish are caught by anglers in a boat and then placed in one or more live wells in the boat, either stand-alone live wells or built into the boat. Prior to the end of the tournament, the anglers typically drive the boat back to the weigh-in station, retrieve the caught fish from the live wells, place the fish in a weigh-in bag, and carry the fish to the weigh-in station to log their catch and have the tournament results recorded. After the weigh-in, the anglers then release the fish back into the lake, hopefully to continue growing and become caught, and released, again in the future. One of the main goals of the catch-and-release method, and why it has been adopted by the major sport fishing associations, is to help maintain healthy fishing sources for generations to come.

In the catch-and-release method of many fishing tournaments, including largemouth bass tournaments, smallmouth bass tournaments, and so forth, it is a common requirement that the fish that are caught must be maintained in a live condition until the weigh-in, and then released back into the lake or other body of water at the end of the tournament.

While many types, sizes, styles, shapes, and brands of fishing boats exist, a common form of fishing boat, particularly for tournament fishing, is the bass boat. As with most boats, a bass boat has a bow and a stern. An elevated fishing or casting platform, or deck, is usually provided at the bow for one angler to fish from, and another elevated fishing or casting platform, or deck, is usually provided at the stern for a second angler. Each casting deck or platform is usually fitted with one or more pedestal-style seats, or perhaps a bicycle seat. The seats themselves are mounted atop a seat pole, and the bottom of the seat pole contains a smaller diameter extension or stem that is insertable into a receiving hole in the casting platform. Multiple storage compartments are typically provided beneath the bow and stern casting decks of a bass boat for storing fishing tackle, fish, clothing, emergency equipment, and so forth. Typically, each storage compartment has an opening which is covered by a hinged cover or lid that forms part of either the bow or stern casting deck. When the hinged cover is lifted and pivoted upward, a fisherman can access the interior of a storage compartment to insert into or remove an object from the compartment. When the hinged cover is lowered into the closed position, it typically lies flush with the surrounding casting deck area and can support the weight of a fisherman standing thereatop.

A driving console, or helm, is usually located between the bow and stern, and is usually mounted on the floor of the boat, not in an elevated position. Various electronics and other controls are typically located at the helm, including a steering wheel, a throttle, numerous gauges, indicators, and other feedback devices providing the driver with information about the boat, the engine, and various systems.

It has become common for many bass boats to be equipped with at least one, and often two or more live wells. Often, one live well is located beneath a compartment lid in the bow deck, and one or two additional live wells are located beneath a compartment lid in the stern deck. Basically, a live well is a water tank in the boat that is large enough to hold the fish that are caught. The live well is usually supplied with water from the body of water in which the boat is located, and is aerated in order to assure that oxygen is made available to the fish that it holds. Circulation of the water in the live well is another common feature that helps to maintain the fish in good condition. Pumps are used both to pump fresh water into the live well from the lake or other body of water and to recirculate the water in the live well. The live well is typically drained when the boat is stored for any extended time period. The piping or plumbing system for the live well is usually equipped with one or more valves that control the flow of fresh water to the live wells, the drainage of the water therefrom, and the recirculation of water therein.

Several types of pumps and aerators have been employed, with varying designs of the fluid path of the water depending on the type of pumps involved, the number and type of valves included in the plumbing, and the desires of the boat owner. Early forms of aerators included a pump to draw water in from the lake and spray the water out a distribution manifold in the form of small jets. Other forms used pumps to cause air to bubble up from the bottom of the live well. Still others use an air lift pump to cause air bubbles to travel up a water lift tube, bringing along entrained air in the water. Regardless of the many forms of aeration, a common component of such a system is a pump, such as a centrifugal rotary bilge pump, which is commonly known in the art. Many bass boats come equipped with through-hull transom pumping systems that pump water from the lake through the hull of the boat into the one or more live wells on board the boat via a plurality of water conveyance tubes and associated valves and actuators. Even more sophisticated systems have become common that include air-relief lines in the pumping system, and other various ways of preventing vapor lock in the piping system.

For tournament anglers, but also in general for casual or recreational anglers, it is often desirable (if not required) to bring the caught fish from the boat to another location in a live and healthy condition. This is achieved, in large part, by the attributes of the bass boat and the live wells described above. However, this is also facilitated by the use of transport containers. In general, a transport container comprises a portable compartment for holding water from either the lake or the boat's live well, along with the fish. The most common form of transport container is a flexible bag, commonly referred to as a weigh-in bag. As used herein, the term "bag" or "weigh-in bag" refers to all the common forms of transport containers. These bags include a closure mechanism, often a zipper, to ensure the fish do not escape and/or the water does not unintentionally exit the bag. Many bags also include handles to facilitate transport of the fish. But while these common transport bags are useful, they have many drawbacks.

In order to keep the fish alive, the bags must be filled with water, and typically this means the angler must open the bag's top enclosure (e.g., zipper, etc.), lean over the side of the boat, dip the bag in the lake, and bring the filled bag into the boat. But once the filled bag is in the boat, there is no easy way to retrieve fish from the live well and insert them into the bag. The bag is not freestanding, and therefore must be held or retained upright in some manner. Often this requires the use of a second person, which is inefficient, time-consuming, and frustrating. Many times, if there is a second person in the boat, that person is typically performing other tasks and cannot devote time to simply hold the bag.

Without a second person, the bag is unwieldy, spillage often occurs, and frustrations mount. While holding the bag or its handles with one hand, the angler must open the live well with the other hand, and attempt to retrieve the caught fish with only one hand. This is extremely difficult to do, particularly when the fish in the live well are, as desired, lively and healthy. The difficulty and time involved in the typical process also often results in losing fish out of the boat because the angler is incapable of maintaining the bag and capturing the fish. Obviously in tournament settings, even one lost fish can be the difference between winning and losing.

What is needed is a system for holding a bag in an upright and ready position to enable the angler to use both hands to retrieve the fish from the live well and safely and securely deposit the fish into the transport container. An additional benefit would be achieved by providing a system for automatically filling the bag with water. Still further benefits would be achieved by providing a system for easy use with boats of many common styles and varieties, using much equipment that already exists on the boats. Additional benefits would be achieved by providing a system that can be plumbed into the boat's live well plumbing system once, and provide the ability for a user to simply select whether, and when, to activate the system. Additional benefits would be achieved by providing a system that can be easily stored under the lid of a compartment.

SUMMARY

The disclosure herein is directed to an apparatus and system for facilitating an angler in placing fish in a transport container from a boat's live well. The apparatus includes a pole for inserting into a seat post receiver of a boat, and having a hook on its top for receiving handles of a transport container. The apparatus also preferably includes a fill tube connected to the pumping system of a boat's live well plumbing system.

A support for a fish transport bag is provide which includes a post having an upper post end and a lower post end. The upper post end comprises a hook and the lower post end comprises an insert stem depending therefrom for insertion into a pedestal seat base having a female opening therein for complementary receiving of said insert stem. An inlet fluid port is coupled to the post or to the hook body for connection to a water supply. An outlet fluid port is coupled to the hook body or to the post near the upper post end, wherein the outlet fluid port is in fluid communication with the inlet fluid port and selectively conveys water out of the outlet fluid port and into the fish transport bag.

A method for transferring fish from a live well to a bag comprises inserting a support post into a pedestal seat base opening. The support post has an upper end and a lower end, wherein the lower end further comprises a stem depending therefrom and wherein the upper end further comprises a hook having a fluid outlet port connected thereto. The inserting step further comprises inserting said stem into said pedestal seat base opening. The method includes providing a fluid communication path from a live well to the fluid outlet port of the hook, and placing a bag on the hook. The bag further comprises an opening therein and handles thereon, wherein the placing step further includes placing the handles on the hook. The method includes inserting the outlet fluid port into the opening of the bag and activating fluid flow from the live well through the outlet fluid port and into the bag. The method includes retrieving fish from the live well, depositing the fish into the bag through the opening, deactivating fluid flow from the outlet fluid port, and removing the bag from the hook.

A system for facilitating retrieval of fish from a first location to a bag comprises a post having an upper post end and a lower post end; a hook coupled to the upper post end and having a fluid path therein in communication with a fluid inlet port and a fluid outlet port; tubing for connecting the hook in fluid communication with a live well pumping system of a boat; a valve for connecting the tubing in fluid communication with a pump of the pumping system and a live well; an actuator operatively connected to the valve for selectively altering a fluid flow path within said valve.

A support for a fish transport bag comprises a hook having a hook body; a mounting stem depending from a first surface of the hook body; a fluid inlet port through a second surface of the hook body; a fluid outlet port through a third surface of hook body, wherein the fluid outlet port is in fluid communication with the fluid inlet port; a valve for alternately opening and closing the fluid outlet port for allowing and preventing, respectively, fluid to flow through the outlet port.

DESCRIPTION OF DRAWINGS

FIG. 8A is a side elevation view of a hook according to a second embodiment.

FIG. 8B is a side elevation view of a hook according to a third embodiment.

FIG. 8C is a side elevation view of a hook according to a fourth embodiment.

FIG. 8D is a side elevation view of a hook according to a fifth embodiment.

FIG. 8E is a side elevation view of a hook according to a sixth embodiment.

FIG. 8F is a perspective view of a hook according to a seventh embodiment.

DETAILED DESCRIPTION

In general, the figures herein depict various embodiments for the purposes of illustration only. The figures, and indeed the description of the embodiments, are not to be deemed limiting in any way on the scope of the invention or the claims appended hereto. Various structural details and embodiments have been chosen for illustrative purposes only, it being unreasonable to attempt to depict or exhaustively describe every detail of every conceivable embodiment.

As used herein, various terms have been selected as being illustrative of the more general forms, types, and styles of structures of which they form a part. For example, as discussed above, "bag" or "weigh-in bag" is not limited to one particular style of fish transport container. Similarly, "boat" refers to any type, style, and size of boat and is not limited to a bass boat; "fish" refers to any species of marine life and is not limited to bass or other sport fish; "tubing" or "tube" refers to any type, style, size, and material of fluid piping or conveyance structure through which liquid can flow, and is not limited to any particular type of flexible tubing per se.

Figure 1:
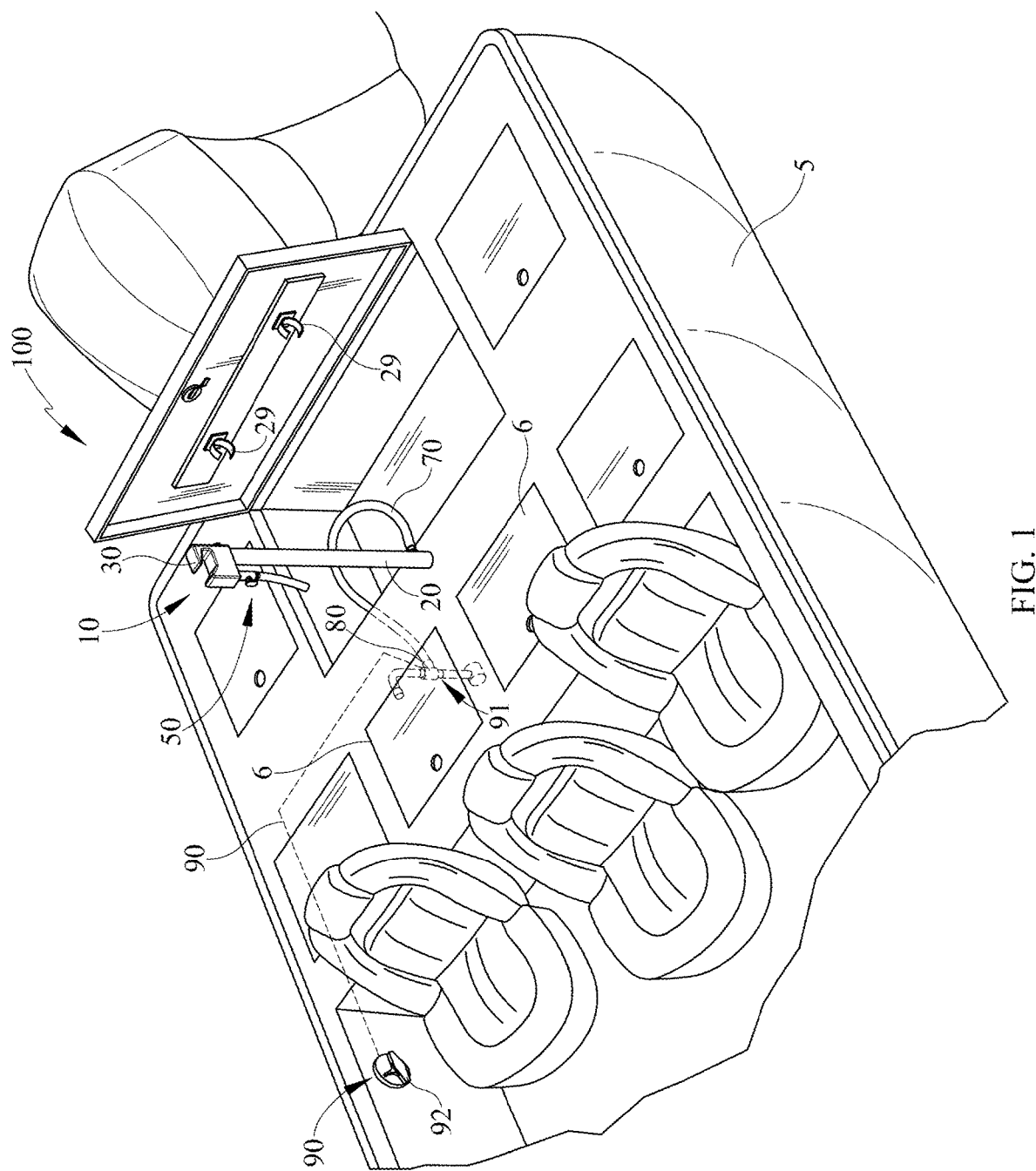
FIG. 1 is a perspective view of an embodiment showing components of the system installed in a boat.

FIG. 1 shows an embodiment of the system 100 for use in a boat 5 with live wells 6. As described above, the figures herein depict an example boat with example live wells. In particular, a bass boat 5 is depicted with two live wells 6 located in the stern casting deck. Obviously, the description is not intended to be limited to that style of boat, or to that style or number of live wells. Similarly, the description is not intended to be limited to any particular species of fish or style or purpose of fishing (whether competitive, recreational, commercial, and so forth).

Figure 2:
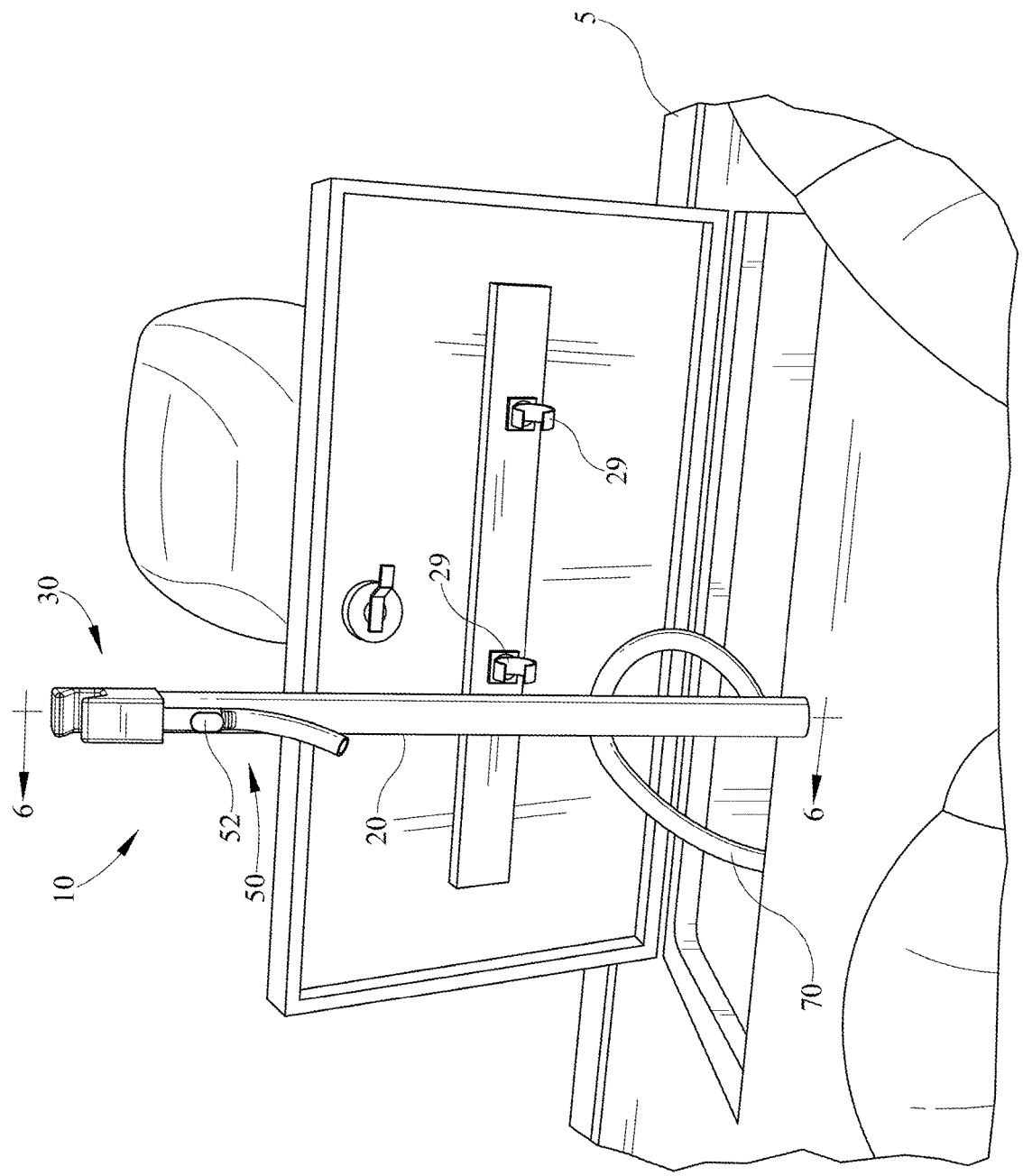
FIG. 2 is a closer-up perspective view of a post of an embodiment shown inserted into a seat post receiver of a boat.
Figure 3:
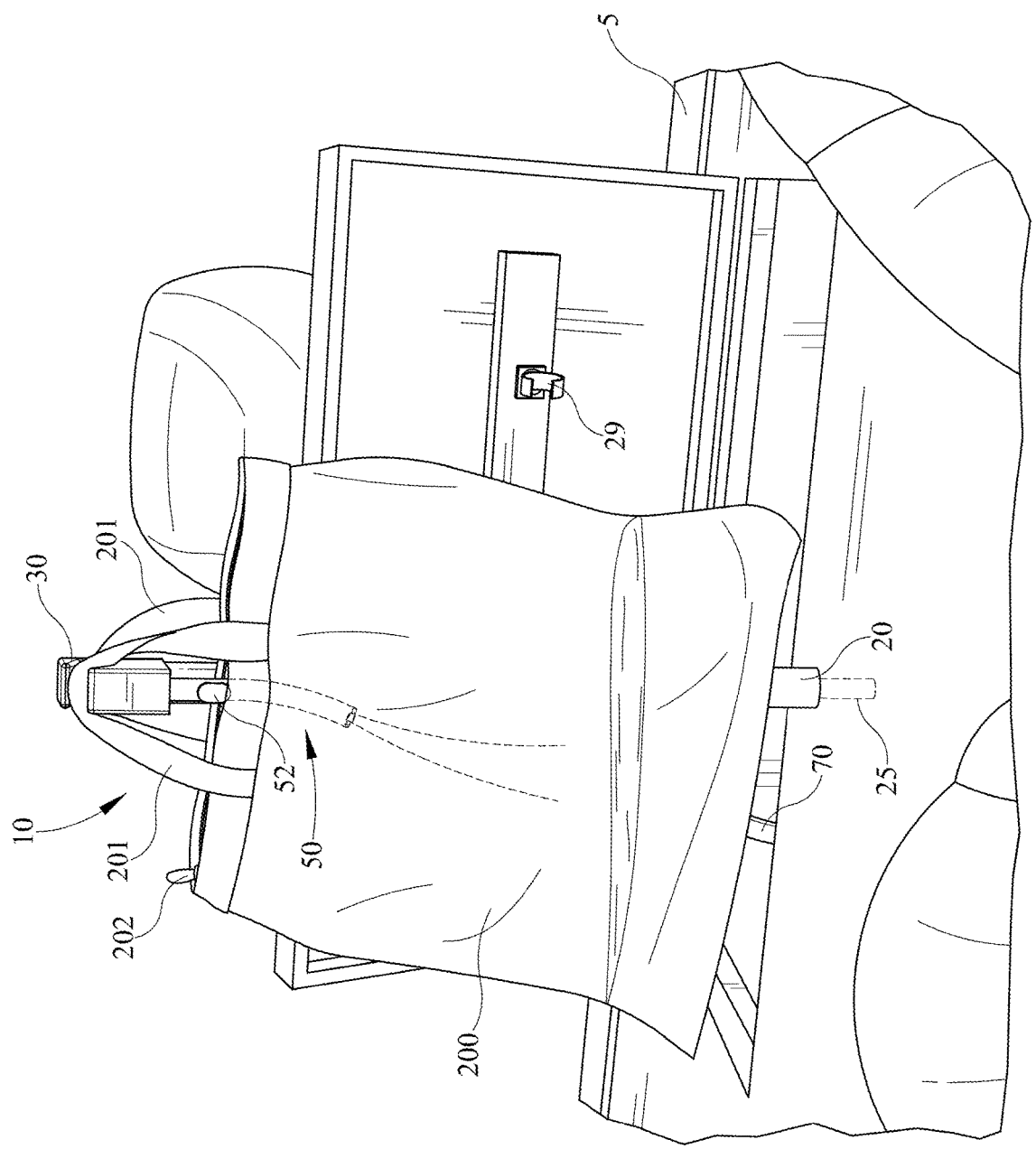
FIG. 3 is a perspective view of the post of FIG. 2 with a weigh-in bag on a hook and in a closed position.
Figure 4:
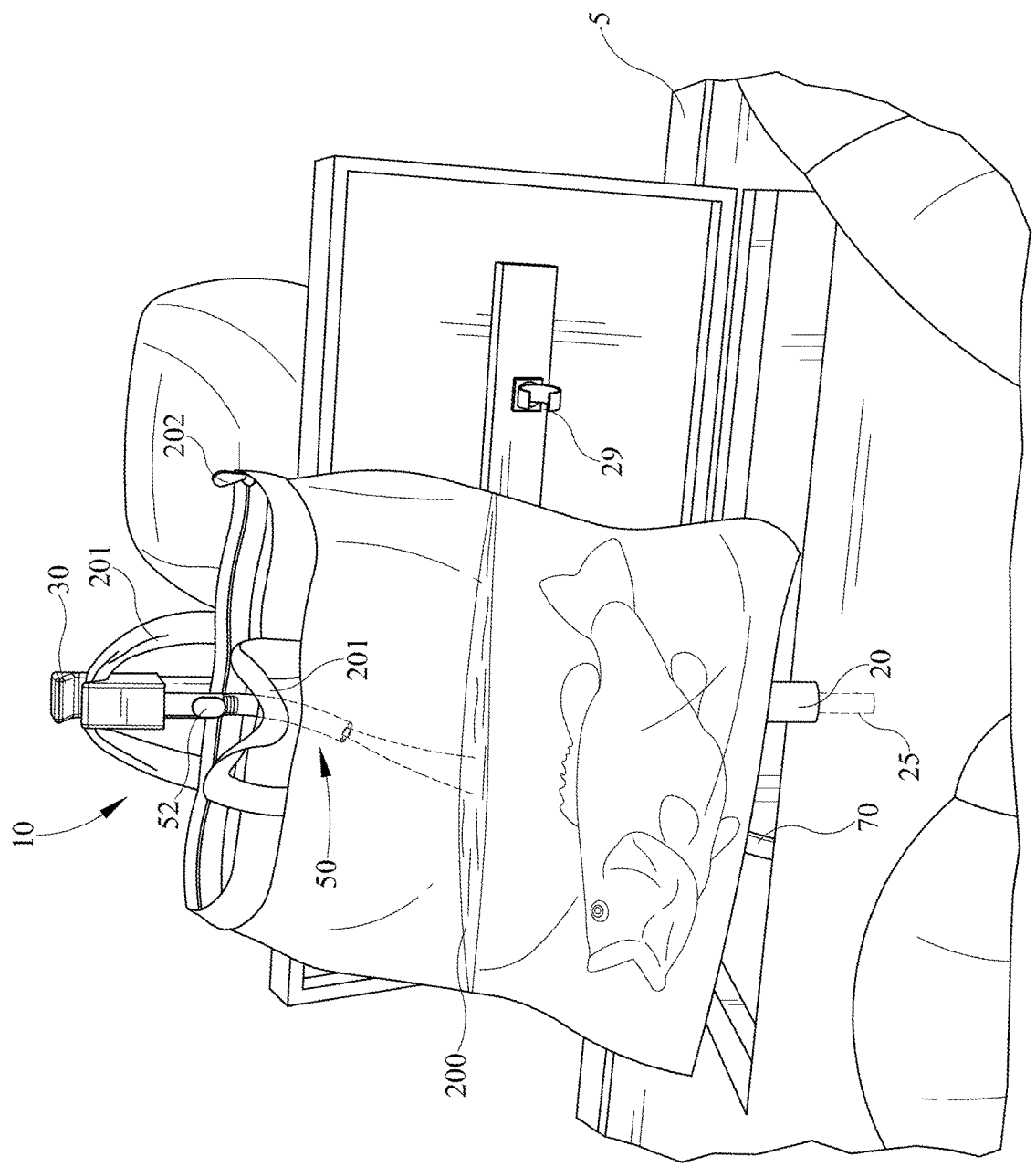
FIG. 4 is a perspective view of the apparatus of FIG. 2 with a weigh-in bag on a hook and in an open position.
Figure 5:
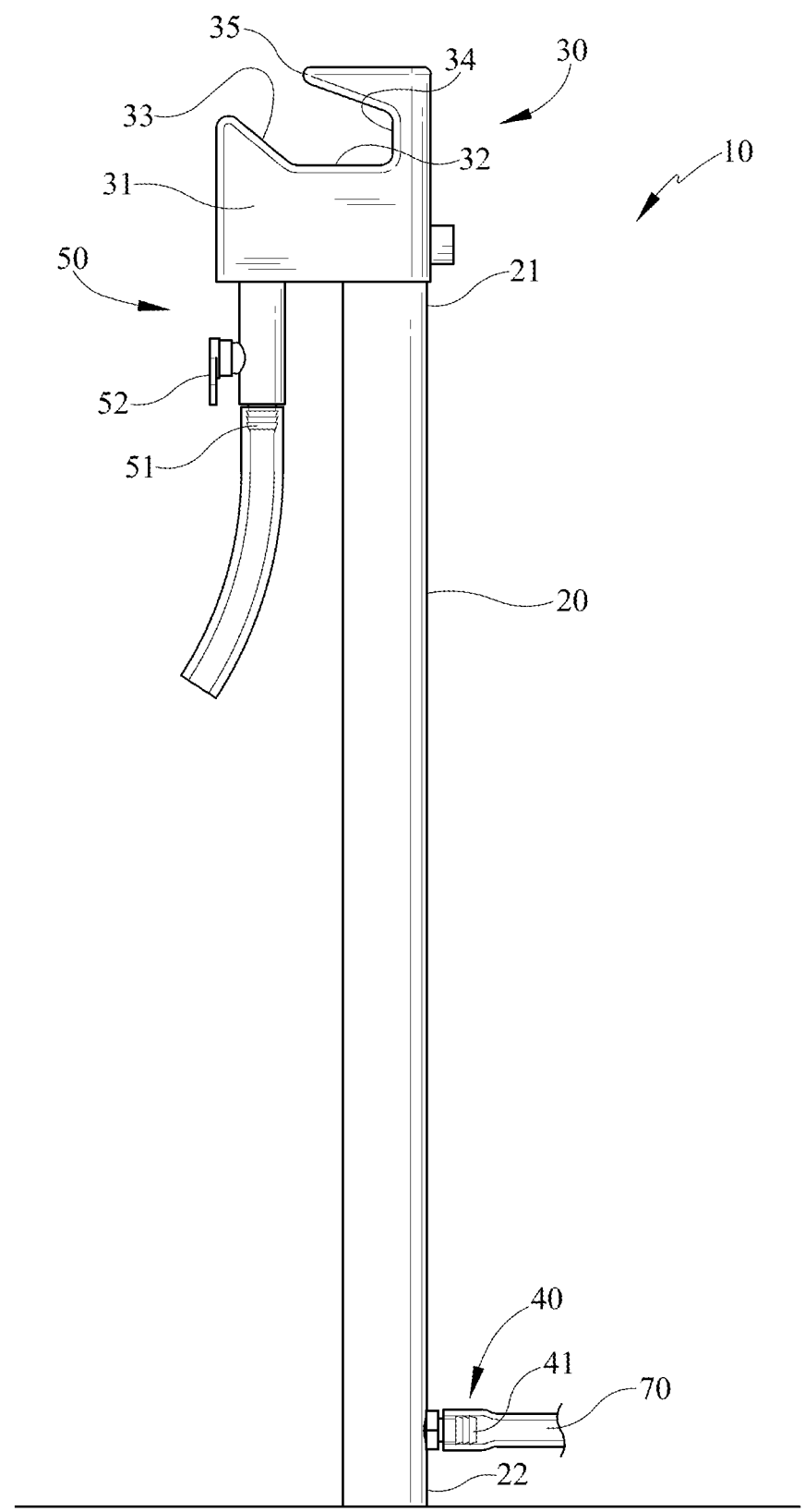
FIG. 5 is an elevation view of the apparatus of FIG. 2.
Figure 6:
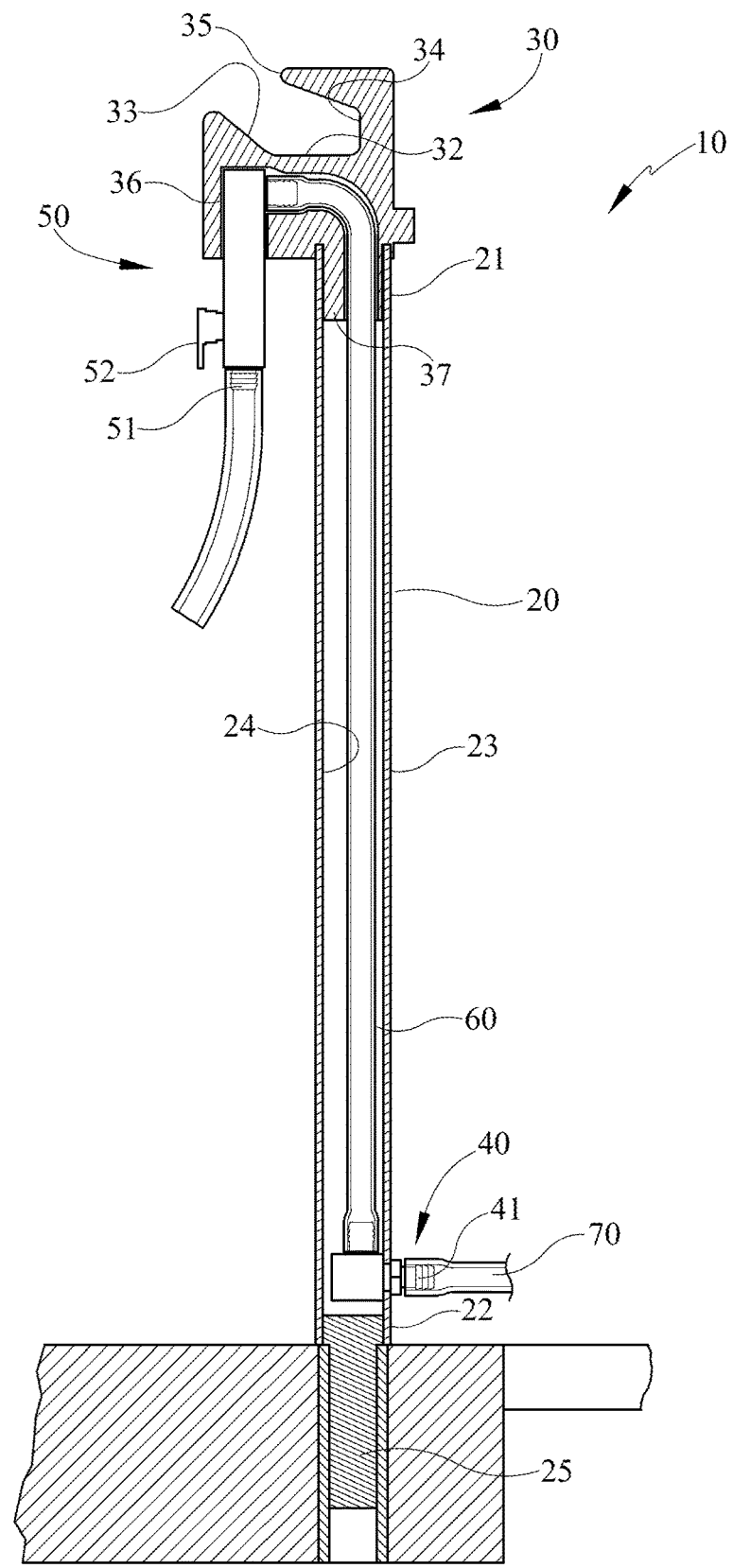
FIG. 6 is a section view of the apparatus of FIG. 5, taken along section line 6-6 of FIG. 2.

The system 100 generally includes a post 20 with a hook 30 coupled thereto, tubing 60 for connection to a live well 6 plumbing system of a boat 5, a valve 80, and an actuator 90. Referring also to FIGS. 2, 5, and 6, the post 20 includes an upper post end 21, a lower post end 22, outer post wall 23, and inner post wall 24. At the lower post end 22 is a stem 25 for insertion into a pedestal seat receiver that is commonly provided in boats 5 in various locations, including in a bow casting deck, in a stern casting deck, and also sometimes in a boat floor or subfloor. Preferably the post 20 is made of a sturdy material with sufficient rigidity without being too heavy to be cumbersome. In the preferred embodiment the post 20 is made of anodized aluminum of approximately 1½ inch outer diameter with a hollow interior inside the cylindrical inner post wall 24, and in lengths that can be anything of preference, but typically in the range of 18 inches to 36 inches, most preferably between approximately 26 inches and 30 inches. Preferably the stem 25 is solid and of a size and shape to be received in standard pedestal seat receptacles, which in the preferred embodiment is approximately three inches in length with an outer diameter of ¾ inch.

The post 20 of the embodiment shown also includes an inlet fluid port 40 comprising a tube fitting 41. The tube fitting 41 of the embodiment shown is a male barb-type tube fitting for a ¾ inch O.D. (½ inch I.D.) tube, which is a common size. Obviously a tube fitting 41 can be provided to fit any desired tubing diameter.

The upper post end 21 includes a hook 30 coupled thereto for the purpose of removably receiving the handles 201 of a weigh-in bag 200. Many different types and sizes of weigh-in bags (e.g., flexible, non-flexible, opaque, transparent, etc.) are capable of being used with the system 100, and the figures depict one common version in the form of a clear flexible bag having a zippered top closure 202 and two carrying handles 201. Such bags 200 are sold by many vendors, for example: Berkley (heavy duty bag is PVC with nylon handles measuring 27 inches by 24 inches wide); Cabela's (heat sealed vinyl coated polyester bag with woven nylon handles measuring approximately 26 inches high by 27 inches wide); Ego bags (20 mil clear urethane bags with woven nylon handles); Boone bags (heat sealed bags of sizes from 19-30 inches high by 58-65 inches wide); Gator Grip multi-layer reinforced polyester bags; Ardent bags (PVC bags measuring 24 inches high by 25 inches wide); and BassPro bags (PVC bags with woven nylon handles; to name but a few. The post 20 is preferably provided in a length that is sufficiently long to hold the weigh-in bag upright. The post 20 can have a fixed length, or can be of adjustable lengths. Adjustable length post 20 typically is in the 12-18 inch adjustability range, 24-30 inch range, or 30-36 inch range, and the adjustability can be manual, hydraulic, or pneumatic. Manual adjustment means can include telescoping poles, helical twist extension poles, and the like, and each can be lockable if desired, e.g., with a pin or with a ball and detent mechanism.

With continuing reference to FIG. 2 and also FIGS. 3-6 and FIG. 9, the hook 30 can take many different shapes, sizes, and configurations. In the embodiment shown in the figures, the hook 30 comprises a body 31 having a floor 32, a front wall 33, a rear wall 34, a top wall 35, and a stem 37. In the embodiment shown, the hook 30 is coupled to the upper post end 21 via insertion of the stem 37 into a receiving opening in the upper post end 21 of the post 20. The hook 30 also includes an outlet fluid port 50, shown with an outlet tube fitting 51 and a valve 52. In the embodiment shown, the body 31 has an internal cavity 36 through which tubing 60 runs from the inlet fluid port 40, through the hollow interior of the post 20, to the outlet fluid port 50.

Figure 7A:
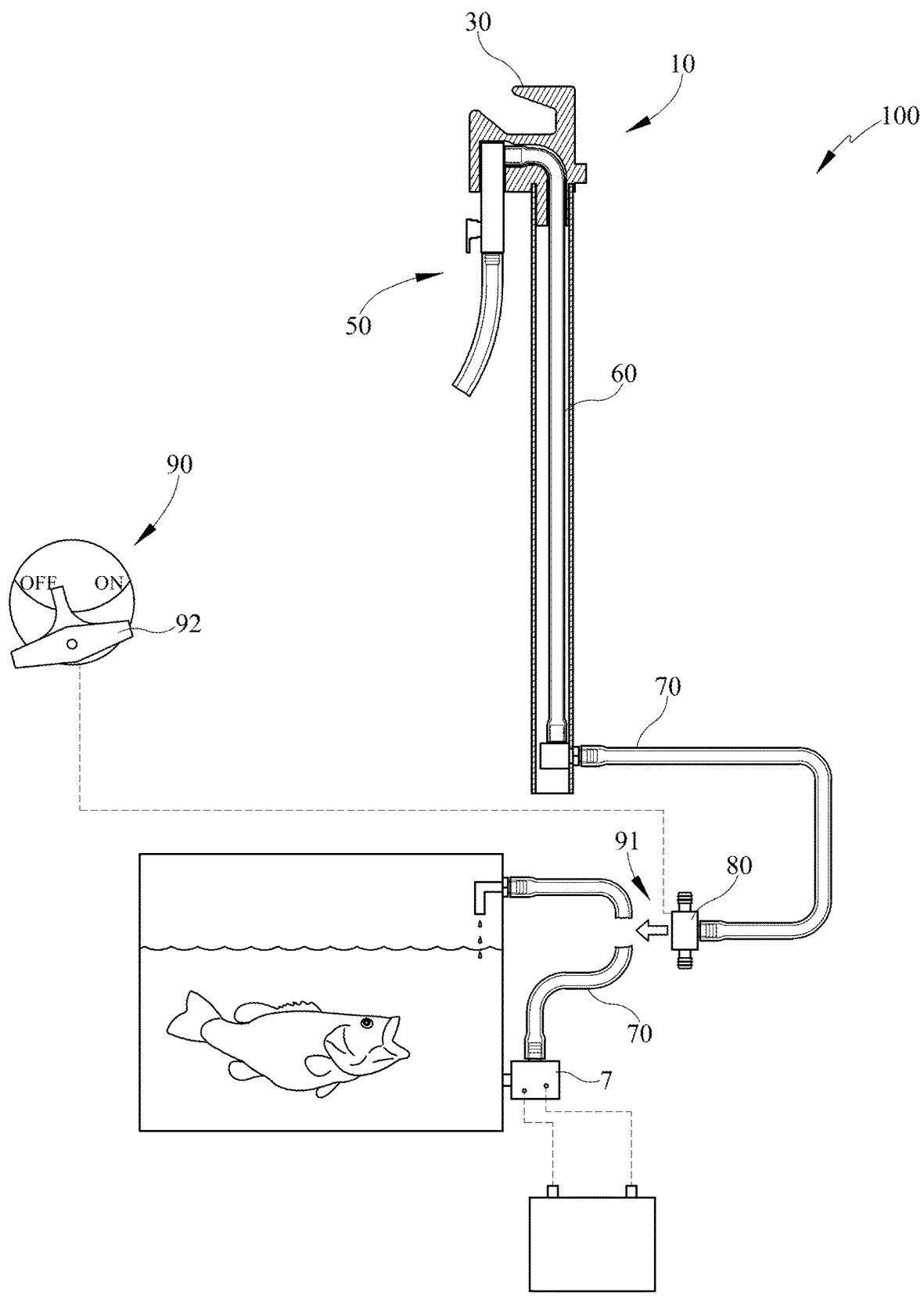
FIG. 7A is a schematic view of the system in use in a fluid plumbing system of a first embodiment of a boat's plumbing system.
Figure 7B:
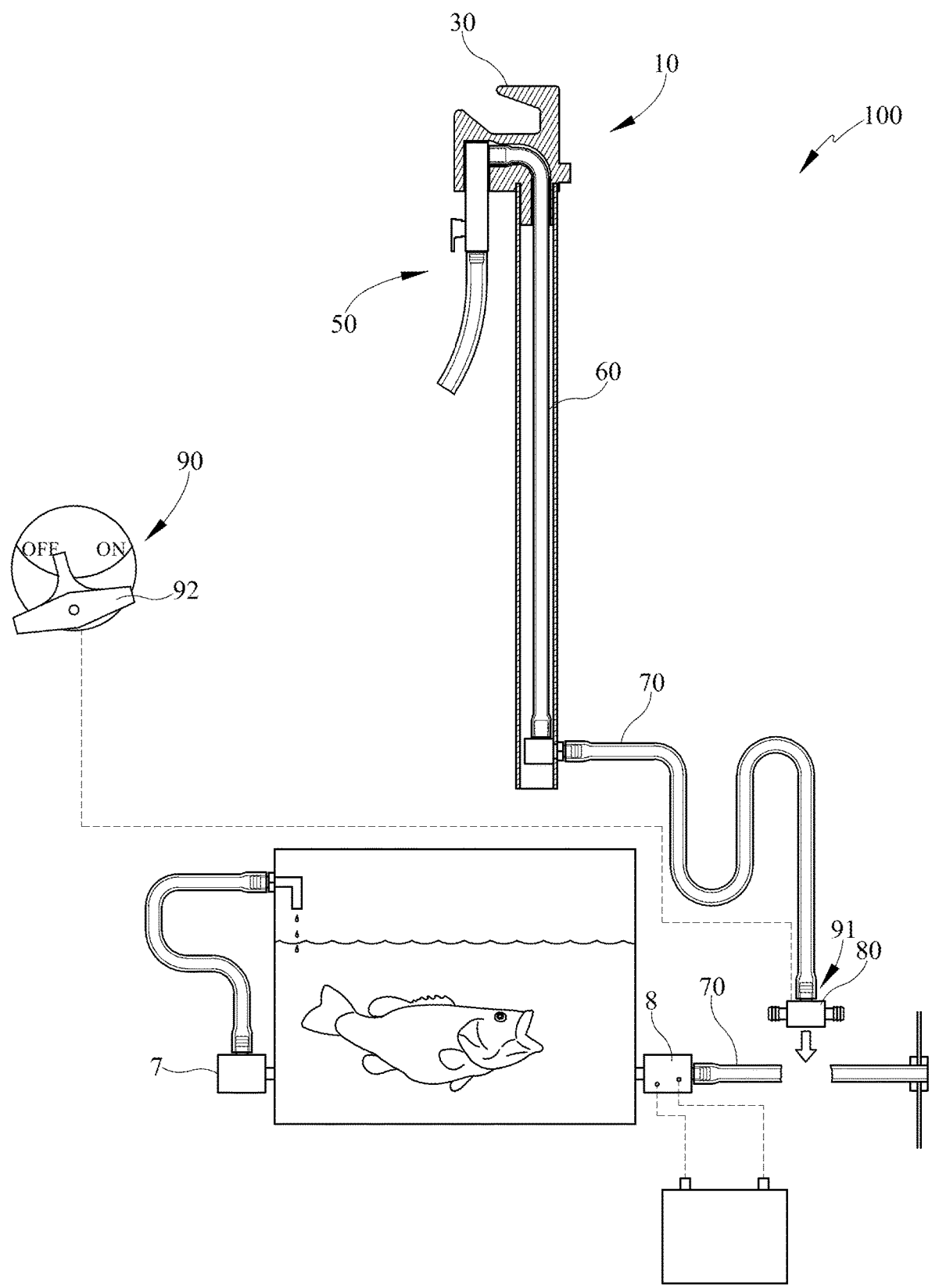
FIG. 7B is a schematic view of the system in use in a fluid plumbing system of a second embodiment of a boat's plumbing system.

The system 100 is easily installed in a boat 5 that already has a live well system with a pump and recirculation capability. In such boats 5, two general types of existing pumping and plumbing systems are prevalent. A first type (typically older boats 5) is shown in FIG. 7A and has a recirculation pump 7 fluidly connected to the live well. A second type is shown in FIG. 7B and has both a recirculation pump 7 and a discharge pump 8 to discharge water from the live well 6 out of the boat 5. In either type of system, typically a water inlet opening is located in the stern of the boat 5, penetrating the hull of the boat 5. The water inlet opening is connected to tubing that runs to the recirculation pump. The pump receives power from the battery of the boat 5 and is controlled by a switch that is operable by the angler, usually from the helm or some other convenient location. Usually the pump has an inlet, fluidly connected to the water inlet through either the live well itself or the boat's hull, and an outlet, fluidly connected to one or more live wells 6 in the boat 5. Various types, styles, and sizes of pumps are possible, including, for example, common centrifugal bilge pumps and the like.

The system 100 is easily installed into the boat's existing live well 6 plumbing of whichever configuration is present in the boat 5. FIG. 7A is a schematic showing how the system 100 would be installed into a plumbing system that does not have a separate discharge pump 8. In this type of system, the angler simply chooses a convenient location in the existing plumbing run between the recirculation pump 7 and the live well. The angler simply cuts the boat's existing tubing and inserts a valve 80 therein (see arrow in FIG. 7A). FIG. 7B is a schematic showing how the system 100 would be installed into a plumbing system that contains separate discharge pump 8. In this type of system, the angler simply chooses a convenient location in the existing plumbing run between the discharge pump 8 and the opening in the boat's hull through which the live well 6 water is discharged out of the boat 5. The angler simply cuts the boat's existing tubing and inserts a valve 80 therein (see arrow in FIG. 7B).

In both cases, many styles and types of valve 80 are possible, but the preferred valve 80 is a three-way valve, model V5 pump out valve (e.g., model V5FET or V5FS) manufactured by Flow-rite. The valve 80 has an inlet to receive water from the recirculation pump 7 or discharge pump 8 and two outlets: one leading to the live well 6 (to replace the fluid connection severed by inserting the valve 80) and one leading to the inlet fluid port 40 of the apparatus 10. The valve 80 includes an arm that alternately opens and closes fluid flow to two of the three fluid paths in the valve 80. An actuator 90 (shown schematically in FIGS. 7A and 7B by a dashed line) comprises a typical push-pull cable housed in a sheath. One end of the actuator 90 is an actuator connector 91 and is connected to the arm of the valve 80. The other end of the actuator 90 is an operator lever 92 and is operable by the angler to selectively operate the valve 80. Typically the operator lever 92 of the actuator 90 is mounted in a convenient location at or near the helm. Also, the supply tubing 70 is typically mounted in convenient location and is supported as needed, usually underneath the casting deck (either bow or stern, or both).

In a similar manner of mounting or supporting the supply tubing 70, preferably the system 100 includes one or more storage clips 29 for releasably mounting the post 20 on a convenient location in the boat 5. Preferably, the post 20 will be removably mounted to the underside of a deck compartment lid, as shown in FIGS. 1-4.

Once the system 100 is installed, it is quite simple to use, repeatedly and as often as necessary, without the need to install or reinstall anything. When there are fish in the live well 6 that an angler wants to simply remove and transport in a manner that creates the best possibility for keeping the fish alive, the angler simply needs to retrieve the post 20 from its storage location in the boat 5 and place the stem 25 of the post 20 in the pedestal seat receiver. This places the post 20 in a vertical position with its hook 30 elevated above the floor or deck. The angler opens the weigh-in bag 200 and places the handles 201 of the bag 200 on the hook 30, while inserting the outlet fluid port 50 inside the open bag 200. The hook 30 holds the handles 201 of the bag 200 and keeps the bag 200 in an upright and stable position. Now that the bag 200 is supported by the hook 30, with or without the bottom of the bag 200 touching the deck, the angler moves the operator lever 92 of the actuator 90 into the "fill" or "on" position, and opens the valve 52 of the outlet fluid port 50. Water automatically begins flowing into the bag 200, and both the angler's hands are now completely free to retrieve fish from the live well.

The angler then simply retrieves fish from the live well 6 and safely and easily deposits each fish into the bag 200, which is supported by the hook 30. If the bag 200 fills up with water from the outlet fluid port 50 before all the fish are placed therein, the angler simply closes the valve 52 and moves the operator lever 92 of the actuator 90 into the "off" position to stop filling the bag 200. Once all the fish have been moved from the live well 6 into the bag 200, the angler removes the handles 201 from the hook 30 and closes the closure 202 of the bag 200, thus enabling the transport of the fish to another location, with healthy aerated water from the live well 6 inside the bag 200 to give them comfort.

As stated above, various alternative hook 30 designs are possible, beyond the embodiment shown in the figures. For example, FIG. 8A shows a second embodiment of a hook 30 with a closure mechanism 301 in the form of a spring-assisted latch 302. The spring force tends to bring the latch 302 to a closed position in a clockwise orientation as shown in FIG. 8A, in which case the latch 302 must be pulled to open. The latch 302 could be pivotably coupled to the front wall 33 (as shown in FIG. 8A), or alternatively could be coupled to the top wall 35. Additionally, the spring force could be made to act in the counter-clockwise direction as shown in FIG. 8B, in which case the latch 302 must be pushed to open.

FIG. 8C shows an fourth embodiment wherein the closure mechanism 301 comprises one or more curved posts 303 upstanding from the floor 32. The curved posts 303 create a curvate entry path in order to place the handles 201 of the weigh-in bag 200 onto the hook 30. This complicated entry movement, desirably, renders it difficult for the handles 201 to inadvertently detach themselves from the hook 30.

FIG. 8D shows a fifth embodiment having an extension 304 extending away from the vertical post 20 in a rearward direction (that is, opposite the direction from which the bag handles are inserted onto the hook 30). FIG. 8E shows an alternate embodiment having an appurtenance 305 extending away from the vertical post 20 in a rearward direction. The version shown in FIG. 8E comprises a spiral or curved appurtenance 305.

FIG. 8F shows a seventh embodiment wherein the closure mechanism 301 comprises a latch 302 that swings, rather than pivots as in FIGS. 8A-8B, similar to that of latches on gates. These and other forms of closure mechanisms 301 are possible as additional features for the hook 30 as desired.

Figure 9:
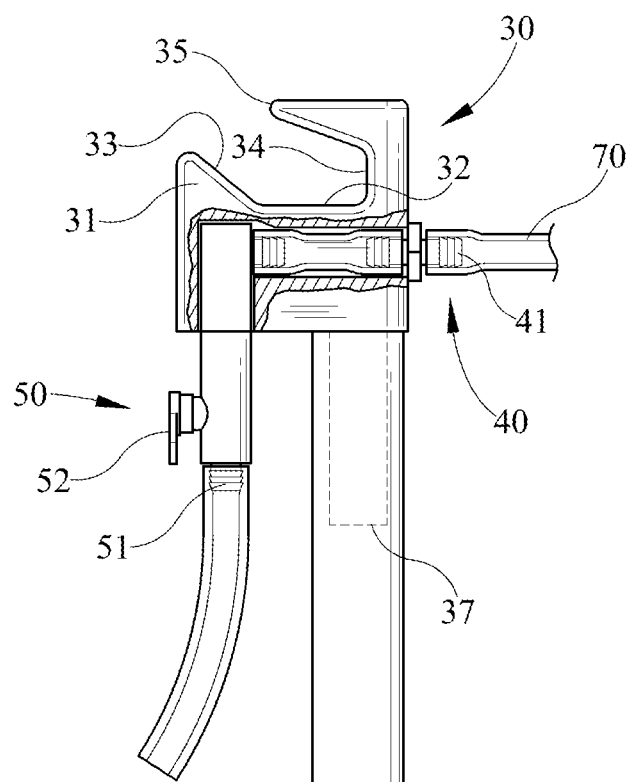
FIG. 9 is a side elevation view of a hook according to an eighth embodiment.

Alternate embodiments of the hook 30 and post 20 are also contemplated. For example, the hook 30 could itself be provided in varying heights so as to accommodate bags 200 of varying sizes. Also, the hook 30 could be adjustable in height, such that a user can lengthen or shorten, for example, the rear wall 34 to achieve height adjustability. Further, as shown in FIG. 9, the body 31 of the hook 30 could itself have the inlet fluid port 40 as well as the outlet fluid port 50, and the stem 37 of the hook could be the same as stem 25, that is, could be a standard type of stem for insertion into a pedestal seat receptacle. In this embodiment, the hook 30 can be used with any standard type of pedestal, not merely with post 20, which provides a stand for the hook 30, and the fluid flow path never needs to reside within tubing 60 within the inner post wall 24.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended to the application once filed as a non-provisional application.

What is claimed is:

1. A fish transport bag hook and support comprising:
a post having an upper post end and a lower post end, wherein said post is a cylindrical pole having a first outer diameter;
an insert stem extending from said lower post end of said cylindrical pole for insertion into a pedestal seat base having a female opening therein for complementary receiving of said insert stem, wherein said insert stem includes a second outer diameter smaller than said first outer diameter of said cylindrical pole;
a hook having a hook body, wherein said hook body includes a stem received in said upper post end of said cylindrical pole and a remaining portion of said hook body extending from said upper post end of said cylindrical pole and said stem, wherein the remaining portion of said hook body of said hook outside of said upper post end of said cylindrical pole includes an inlet fluid port and an outlet fluid port in fluid communication through said remaining portion of said hook body;
a valve in said outlet fluid port positioned below said hook body;

wherein said inlet fluid port coupled to said remaining portion of said hook body is accessible outside said cylindrical pole for connection to a water supply; and wherein said outlet fluid port coupled to said remaining portion of said hook body is in fluid communication with said inlet fluid port through said remaining portion of said hook body and selectively conveys water out of said outlet fluid port and into a fish transport bag;

wherein said remaining portion of said hook body includes a floor, a front wall connected to a first end of said floor, a rear wall connected to a second end of said floor, and a top wall connected to said rear wall and providing an opening between said top wall and said front wall inwardly towards said floor; and wherein said opening of said remaining portion of said hook body defines a hooking mechanism configured to temporarily receive one or more handles of the fish transport bag in contact with said floor to hang the fish transport bag therefrom, such that when the fish transport bag hangs from said hook body, said outlet fluid port is in fluid communication with an interior of the hanging fish transport bag.

2. The fish transport bag hook and support according to claim 1 wherein said post includes an outer post wall and an inner post wall, and wherein said outer post wall has said first outer diameter.

3. The fish transport bag hook and support according to claim 1 wherein said outlet fluid port is in fluid communication with said inlet fluid port by a tubing located inside said hook body.

4. The fish transport bag hook and support according to claim 1 wherein said inlet fluid port comprises a male barbed tube connector projecting outwardly from said hook body.

5. The fish transport bag hook and support according to claim 1 wherein said cylindrical pole is a height adjustable pole.

6. The fish transport bag hook and support according to claim 1 wherein said hook further comprises a height adjustable body.

7. The fish transport bag hook and support according to claim 1 wherein said hook further comprises a closure mechanism.

8. The fish transport bag hook and support according to claim 7 wherein said closure mechanism further comprises a latch pivotable between a closed position and an open position.

9. The fish transport bag hook and support according to claim 7 wherein said closure mechanism further comprises a latch swivelable between a closed position and an open position.

10. The fish transport bag hook and support according to claim 1 wherein said hook further comprises at least one curvate entry path.

11. The fish transport bag hook and support according to claim 1 wherein said hook further comprises an extension extending distally from said rear wall.

12. The fish transport bag hook and support according to claim 1 wherein said hook further comprises an appurtenance extending distally from said rear wall.

13. The fish transport bag hook and support according to claim 1 further comprising tubing external of both said hook body and said cylindrical pole connected at said inlet fluid port for connecting said inlet fluid port of said hook body in fluid communication with a live well pumping system of a boat.

14. The fish transport bag hook and support according to claim 13 further comprising a valve for connecting said tubing in fluid communication with a pump of said live well pumping system of said boat.

15. The fish transport bag hook and support according to claim 1 further comprising a boat having a pedestal seat base, wherein of said insert stem is received by said pedestal seat base of said boat.

16. The fish transport bag hook and support according to claim 1 further comprising a fish transport bag having one or more handles.

* * * * *